April 17, 1962     E. S. MEYER     3,029,503
SEAL INSTALLER AND METHOD OF REPAIRING
Filed Aug. 15, 1960
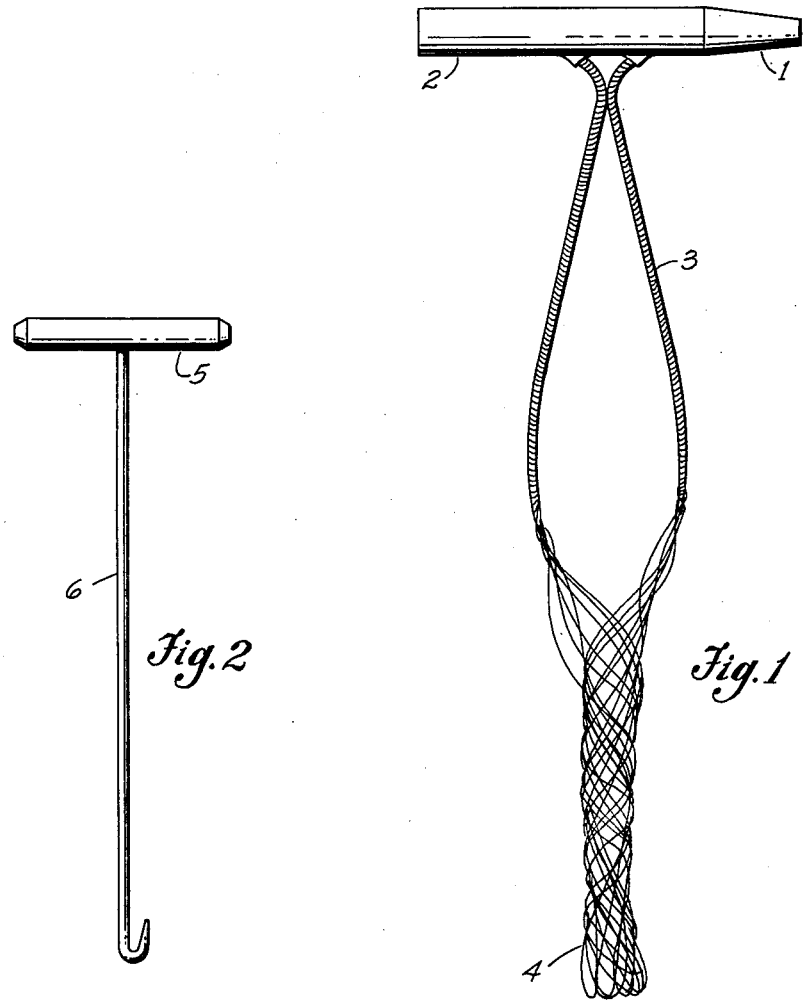
EDWARD S. MEYER
INVENTOR.
BY *George B. Owens*
ATTORNEY

United States Patent Office 3,029,503
Patented Apr. 17, 1962

3,029,503
SEAL INSTALLER AND METHOD OF REPAIRING
Edward S. Meyer, 520 Fairfield Ave., Ridgewood, N.J.
Filed Aug. 15, 1960, Ser. No. 49,801
2 Claims. (Cl. 29—283)

The present invention relates to a seal installer and more particularly to a seal installer used for installing a seal in an automobile crankshaft.

Thus, the present invention contemplates a device for installing the rear main seal of an automobile without disassembling the internal combustion engine.

With the foregoing brief explanation in view, the invention resides in the novel arrangement hereinafter described and claimed, it being understood that changes in the precise embodiment of the invention herein disclosed may be made within the scope of what is claimed without departing from the spirit of the invention. The invention will become apparent from the following description taken in conjunction with the accompanying drawing in which:

FIG. 1 is a perspective view of the seal installer.
FIG. 2 is a perspective view of the seal remover.

The installer shown in FIG. 1 comprises a T-shaped handle 2, with a tapered end 1, connecting cable 3 terminating in the center of handle 2. The seal remover comprises a T-shaped handle 5 and hook 6. As shown in the drawing, the cable 3 has a circular mesh and is adapted to grip an internal combustion engine seal, inserted in the mesh weave 4.

For the purpose of giving those skilled in the art a better understanding and appreciation of the invention, the following illustrative example is given:

Example

The problem is to remove the old engine seal and to install a new seal. First, it is necessary to remove the engine oil pan, and to remove the rear main bearing cap. A hole ⅛" is then drilled in the center of the seal. The seal remover is inserted into the ⅛" hole and the hook 6 is made to engage the seal. The old seal is then slowly removed by pulling with the hand while rotating the crankshaft slowly with the starter. Caution must be used so as not to rotate the crankshaft too much or too fast. After the old seal has been removed, the cable 3 is inserted in the hole and made to go around the crankshaft journal to the starting position. The seal is then inserted in the mesh weave 4 to a distance of about ¼". First pull on T-shaped handle 2 to make certain that the weave 4 has gripped the seal. Rotate the crankshaft slowly while pulling the seal into place. Excess seal is packed in the seal retainer and should not be cut off. The tapered end 1 of T-shaped handle 2 is then used to resize the tip of weave 4 so that the weave can be used over again.

In constructing the tool herein described, the T-shaped handle 2 is made of stainless steel tubing with a forged end 1. The cable 3 and weave 4 is made out of woven stainless steel. Remover T-shaped bar 5 is made of bar aluminum and has a stainless steel hook 6 connected to it.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A hand tool for facilitating the insertion of a packing material used in a narrow groove as a fluid seal, said tool comprising, a generally cylindrical handle formed of a material which is relatively inert to mineral oils and additives thereto, a pair of cables formed of a high tensile strength material, said cables each having one end thereof attached to said handle at spaced points approximately midway along its longitudinal axis, the other ends of said cable being interwoven to form a loose cylindrically shaped mesh, said mesh being so woven that the internal diameter of the cylinder formed thereby is reduced when said mesh is tensioned, and truncated cone shaped means on one end of said handle adapted for insertion into said mesh cylinder to restore the internal diameter of said mesh cylinder to its loose size, said tool serving to grip seal packing material within said mesh cylinder and guide and draw said packing material through the narrow groove in which the packing is to be seated.

2. A hand tool for facilitating the insertion of a seal packing material into a narrow groove formed to receive said packing material, said tool comprising a generally cylindrical handle of a rigid strong material capable of withstanding most substances with which it normally comes in contact, a flexible elongated basket of loose weave, said basket being generally cylindrical in shape and being formed of flexible material having a high tensile strength and being adapted to decrease the internal diameter of said basket when said basket is stretched along its longitudinal axis, the ends of said flexible material forming said basket comprising two cables, the ends of said cables being attached to said handle at spaced points which are approximately midway along the longitudinal axis of said handle so that said cables are at approximately right angles to the longitudinal axis of said handle, one end of said handle being shaped to form a truncated cone of dimensions suitable for insertion into said attenuated basket for restoring the diameter of said basket to its unattenuated size, said tool being adapted to grip an end of a suitable packing material in the end of the basket remote from said handle and for drawing and guiding said packing material in the packing groove of a seal.

References Cited in the file of this patent
UNITED STATES PATENTS

| | | |
|---|---|---|
| 2,164,278 | Kellems | June 27, 1939 |
| 2,249,119 | Palma | July 15, 1941 |
| 2,621,398 | Simmons | Dec. 16, 1952 |
| 2,749,795 | Boykin | June 12, 1956 |
| 2,946,118 | Steck | July 26, 1960 |